(12) United States Patent
Lu et al.

(10) Patent No.: US 10,824,781 B2
(45) Date of Patent: Nov. 3, 2020

(54) RELIABILITY ROBUST DESIGN METHOD FOR MULTIPLE FAILURE MODES OF ULTRA-DEEP WELL HOISTING CONTAINER

(71) Applicant: CHINA UNIVERSITY OF MINING AND TECHNOLOGY, Xuzhou (CN)

(72) Inventors: Hao Lu, Xuzhou (CN); Zhencai Zhu, Xuzhou (CN); Gongbo Zhou, Xuzhou (CN); Yuxing Peng, Xuzhou (CN); Guohua Cao, Xuzhou (CN); Wei Li, Xuzhou (CN); Gang Shen, Xuzhou (CN); Dagang Wang, Xuzhou (CN); Fan Jiang, Xuzhou (CN)

(73) Assignee: CHINA UNIVERSITY OF MINING AND TECHNOLOGY, Xuzhou (CN)

( * ) Notice: Subject to any disclaimer, the term of this patent is extended or adjusted under 35 U.S.C. 154(b) by 2 days.

(21) Appl. No.: 16/333,218

(22) PCT Filed: Dec. 7, 2017

(86) PCT No.: PCT/CN2017/114932
§ 371 (c)(1),
(2) Date: Mar. 13, 2019

(87) PCT Pub. No.: WO2019/085145
PCT Pub. Date: May 9, 2019

(65) Prior Publication Data
US 2019/0362041 A1   Nov. 28, 2019

(30) Foreign Application Priority Data
Oct. 31, 2017 (CN) .......................... 2017 1 1040357

(51) Int. Cl.
| | | |
|---|---|---|
| G06F 30/23 | (2020.01) | |
| E21F 13/00 | (2006.01) | |
| G06F 30/17 | (2020.01) | |
| G06F 111/04 | (2020.01) | |
| G06F 111/08 | (2020.01) | |
| G06F 111/10 | (2020.01) | |

(52) U.S. Cl.
CPC .............. *G06F 30/23* (2020.01); *E21F 13/00* (2013.01); *G06F 30/17* (2020.01);
(Continued)

(58) Field of Classification Search
None
See application file for complete search history.

(56) References Cited

FOREIGN PATENT DOCUMENTS

| CN | 102360403 A | 2/2012 |
|---|---|---|
| CN | 107247828 A | 10/2017 |
| CN | 107291989 A | 10/2017 |

OTHER PUBLICATIONS

Lee et al. "Sampling-Based Stochastic Sensitivity Analysis Using Score Functions for RBDO Problems With Correlated Random Variables", ASME, Journal of Mechanical Design, Feb. 2011, vol. 133, 10 pages. (Year: 2011).*

(Continued)

*Primary Examiner* — Suzanne Lo
(74) *Attorney, Agent, or Firm* — Bayramoglu Law Offices LLC

(57) ABSTRACT

A reliability robust design method for multiple failure modes of an ultra-deep well hoisting container, including: defining randomness of a structural parameter, a material property, and a dynamic load of a hoisting container, and solving a random response of a structural failure for a random parameter using a design of experiment method; establishing reliability performance functions of each failure modes in accordance with failure criterion of the hoisting container; establishing a joint probability model of correlated failures using a copula theory in consideration of probability correlation between the failure modes; establishing, a system reliability model with failure correlation of the hoister container; establishing a sensitivity model concerning each random parameter for system reliability of the hoisting (Continued)

container; and establishing, in conjunction with an optimization design model, a reliability robust optimization design model for the hoisting container using a joint failure probability and parameter sensitivity as constraints.

7 Claims, 3 Drawing Sheets

(52) U.S. Cl.
CPC ....... *G06F 2111/04* (2020.01); *G06F 2111/08* (2020.01); *G06F 2111/10* (2020.01)

(56) References Cited

OTHER PUBLICATIONS

Lu et al. Reliability-Based Robust Design of Mechanical Components with Correlated Failure Modes Based on Moment Method, Advances in Mechanical Engineering, vol. 2014, 17 pages. (Year: 2014).*

Ren et al. "Novel computational methods for stochastic design optimization of high-dimensional complex systems", Iowa Research Onilne, Spring 2015, 307 pages. (Year: 2015).*

Carbogno, "Mine hoisting in deep shafts in the 1st half of the 21st Century", Acta Montanistica Slovaca, pp. 188-192. (Year: 2002).*

Kim et al. "Finite element analysis and modeling of structure with bolted joints", Applied Mathematical Modeling 21, 2007, pp. 895-911. (Year: 2007).*

Roylance "Mechanical Properties of Materials", 2005, 129 pages. (Year: 2005).*

Lu Hao et. al., Practical Method for Reliability-Based Robust Design of Typical Structual System With Multiple Failure Modes, Engineering Mechanics, Aug. 31, 2011, vol. 28, No. 8, pp. 226-231.

Lu Hao et. al., Reliability Sensitivity Estimation of Mechanical Components with Multiple Failure Modes, Journal of Mechanical Engineering, Jan. 31, 2012, vol. 48, No. 2, pp. 63-67.

* cited by examiner

RELIABILITY ROBUST DESIGN METHOD FOR MULTIPLE FAILURE MODES OF ULTRA-DEEP WELL HOISTING CONTAINER

CROSS REFERENCE TO THE RELATED APPLICATIONS

This application is the national phase entry of International Application No. PCT/CN2017/114932, filed on Dec. 7, 2017, which claims priority from the Chinese patent application no. 201711040357.2 filed on Oct. 31, 2017, the entire contents of which are incorporated herein by reference.

TECHNICAL FIELD

The present invention relates to a system reliability robust design method for an ultra-deep well hoisting container in consideration of a mechanical product with probability correlation among failure modes and belongs to the field of technical research on mechanical structural reliability.

BACKGROUND

Currently, most coal wells in China are shallow wells, having a depth of 500 to 800 m from the ground. However, approximately 53% of total reserves of coal resources are buried at a depth of 1000 to 2000 m. It is necessary to use kilometer-deep well hoisting systems (including a hoister, a hoisting container, a hoisting steel wire rope, and the like). A hoisting container is responsible for loading/unloading mined coal resources and bears relatively large vertical loads during hoisting and lowering processes. In addition, because of complex underground hoisting environments, the hoisting container fails in various forms under the action of dynamic loads. In view of structural uncertainty of the hoisting container and uncertainty of various dynamic loads during the hoisting process, the hoisting container becomes a structural system having uncertain parameters during an operation process, and meanwhile, when the system fails, there are usually many different failure modes, and a specific probability correlation exists among the failure modes. Therefore, defining reliability of a hoisting container merely in a single failure mode will reduce estimation accuracy on reliability of the hoisting container, resulting in large deviations in design and maintenance. Using a reliability-based robust design method can reduce the degree of influence of structural uncertainty on reliability of a hoisting container, thereby improving safety and reliability of the hoisting container.

SUMMARY

Object of the invention: It is the object of the present invention to provide a feasible probability modeling and analyzing method for system reliability estimation and structural optimization design of an ultra-deep well hoisting container in a joint failure state of multiple failure modes.

To achieve the foregoing objective, the present invention adopts the following technical solutions:

A reliability robust design method for multiple failure modes of an ultra-deep well hoisting container, including: firstly, establishing a parameterized model of an ultra-deep well hoisting container according to a structural dimension of the hoisting container; secondly, establishing random sampling matrixes of random variables according to probability characteristics of random variables of the hoisting container, and analyzing a strength response and a stiffness response of the hoisting container in the sampling matrixes by using a finite element method; thirdly, establishing a mapping relationship between a random response and a random sampling matrix by using a Kriging method, and respectively establishing explicit functions in strength and stiffness failure modes; then, calculating failure probabilities in the failure modes by using a saddlepoint approximation method; and finally, constructing a joint probability model among the failure modes by using a Clayton copula function, and solving system reliability in a joint failure by using a system reliability method.

Specific implementation steps are as follows:

step 1: determining means and variances of a dimension parameter, a material property parameter, and a load of an ultra-deep well hoisting container, determining a distribution type of each parameter, and establishing a finite element model of the hoisting container;

step 2: obtaining a random response sample of a structural failure for each set of driving parameters according to the means and variances of the basic parameters of the hoisting container determined in step 1 in conjunction with a Latin hypercube sampling design of experiment method;

step 3: fitting input and output samples in step 2 by using a Kriging method, to obtain a mapping relationship between a failure response and a structural performance parameter of the hoisting container, and respectively establishing reliability functions in the failure modes in accordance with design criteria of failures of the hoisting container;

step 4: respectively solving, according to probability information of the basic parameters, failure probabilities of the failure modes by using a moment-based saddlepoint approximation method;

step 5: establishing a joint failure distribution with probability correlation of the failure modes by using a Clayton copula function, establishing a system reliability model in a joint probability failure in conjunction with a system reliability theory, and solving a system failure probability;

step 6: establishing a sensitivity model concerning a random parameter for system reliability of the hoisting container by using a partial derivative method; and step 7: establishing, based on a reliability optimization model, a reliability robust design model of the hoisting container by using the parameter sensitivity and the system failure probability of the hoisting container obtained in step 5 and step 6 as constraint functions.

Step 1 specifically includes:
determining distribution types, means, and variances of a structural dimension and a material property of the hoisting container;
determining the load of the hoisting container, to determine distribution types, means, and variances of loads, such as a static load, a bending moment, and a torque, borne by the hoisting container in each case; and
establishing a finite element analysis model of the hoisting container based on the foregoing information.

Step 2 specifically includes:
forming a process file of modeling by parameterized modeling of the hoisting container;
forming a process file of finite element analysis by finite element analysis of the hoisting element, where
a structural parameter of the hoisting container includes an overall dimension of the hoisting container and a dimension of a chassis; and a material performance parameter includes an elastic modulus, a Poisson's ratio, and density; and driving, by using a Latin hypercube sampling design of experiment method, the parameters of the hoisting container to perform random finite element analysis, to obtain a random response sample with a random input.

Step 3 specifically includes:

fitting the input and output samples obtained in step 2 by using the Kriging method to establish an explicit function relationship between a random response and a random parameter; and establishing the reliability functions in the failure modes in accordance with design criteria of the failure modes, where unlike other components of a hoisting system, the ultra-deep well hoisting container is a large-scale welded structural component, and when strength reliability of the ultra-deep well hoisting container is investigated, fracture mechanics analysis should be used, and its fracture resistance performance is used as a criterion for strength design.

Step 4 specifically includes:

calculating first three order moments, namely, a mean, a variance, and a skewness, of each function by using a random perturbation technology, and solving the failure probabilities of the failure modes by using a saddlepoint approximation method based on the first three order moments.

Step 5 specifically includes:

performing random sampling by using a uniform sampling method in accordance with a distribution type of a random variable of the hoisting container, to obtain a discrete sample value of each random variable;

substituting the foregoing discrete sample value into the reliability performance function established in step 3, to obtain a corresponding function sample value;

calculating a rank correlation coefficient between two failure modes by using a probability statistics method, substituting the same into a Clayton copula function model to calculate a parameter to be determined of the Clayton copula, and establishing a joint probability model for describing probability correlation;

calculating a joint failure probability with correlation of multiple failure modes of the hoisting container by using the established Clayton copula-based joint probability model; and substituting the failure probabilities of the failure modes and the joint failure probability by using the system reliability theory, to calculate the system failure probability of the hoisting container.

Step 6 specifically includes:

on the basis of establishing a system failure model of the hoisting container, performing derivation on a mean, a standard deviation, and a skewness of a random variable by using a matrix differential technology according to the partial derivative method, to establish a parameter sensitivity model concerning the mean, the standard deviation, and the skewness of the random variable for the system reliability of the hoisting container.

Step 7 specifically includes:

introducing the system reliability and the parameter reliability sensitivity model that are obtained above and are based on a copula function into an optimization design model as constraints, to establish the reliability robust design model of the hoisting container.

Advantages and Positive Effects of the Method of the Present Invention are as Follows:

1) A relatively strong positive correlation is shown between different failure modes of a hoisting container. Unlike a failure independence assumption, such a positive correlation can be described more accurately by using a Clayton copula, thereby improving modeling efficiency and calculation accuracy of system reliability estimation on the hoisting container.

2) The parameter sensitivity represents a degree of influence of a random variable on system reliability of the hoisting container. A sensitivity model concerning a mean, a standard deviation, and a skewness of a random variable is established, and is introduced into an optimization design model as a constraint, so that an impact of uncertainty of the random variable on system reliability is reduced, and robustness of the system reliability of the hoisting container is ensured.

1: upper tray; 2: high-strength bolt set; 3: middle tray; 4: external column; 5: tank wall; 6: internal column; 7: lower tray.

DETAILED DESCRIPTION OF THE EMBODIMENTS

The present invention is further described below with reference to the accompanying drawings and embodiments.

Figure 1:
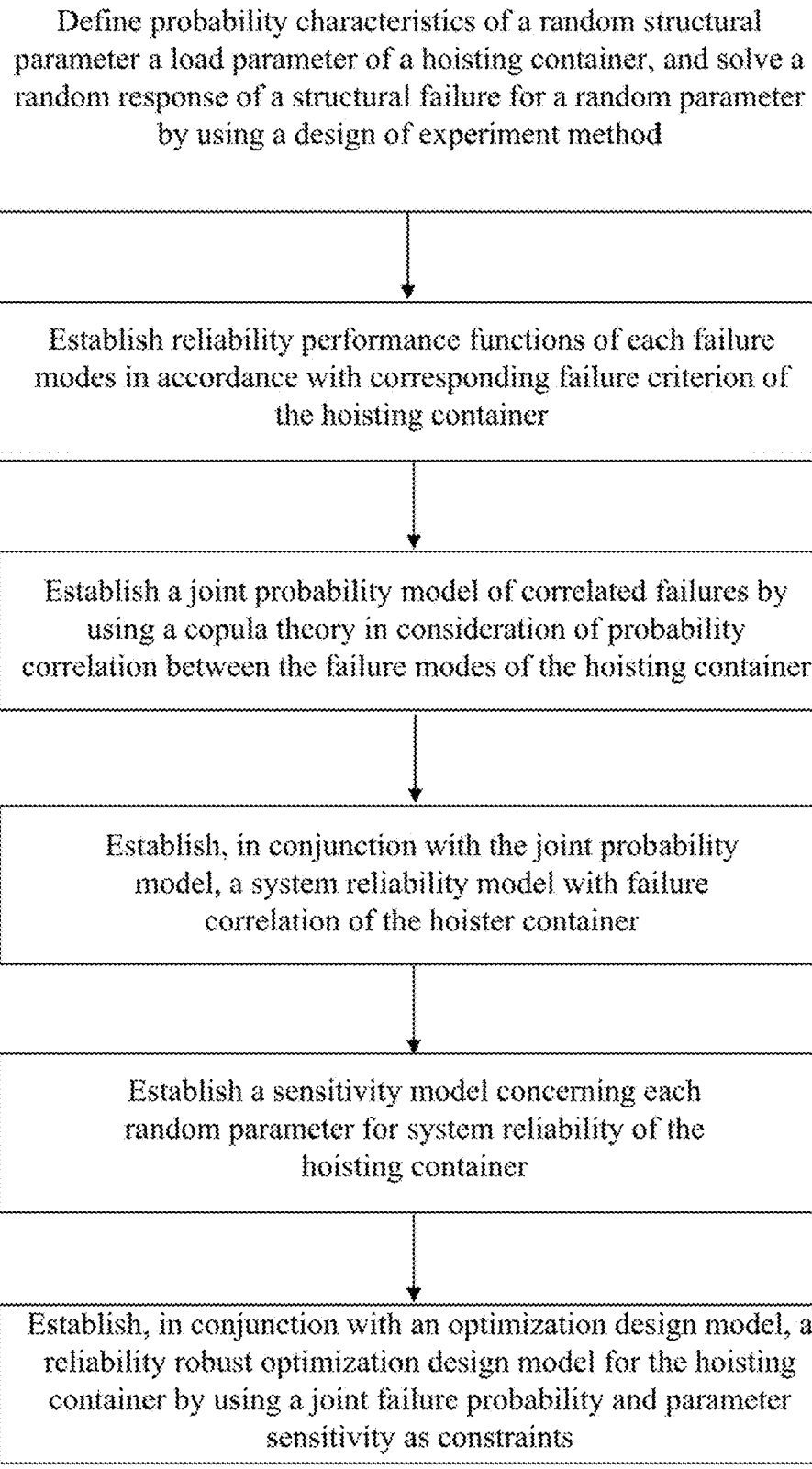
FIG. 1 is a flowchart of implementation of a reliability robust design method for multiple failure modes of an ultra-deep well hoisting container according to the present invention.

As shown in FIG. 1, a reliability robust design method for multiple failure modes of an ultra-deep well hoisting container according to the present invention includes the following steps:

Step 1: Obtain means and variances of parameters, such as a structural dimension, a material property, and a dynamic load, of a hoisting container according to an original design drawing of the hoisting container or by on-site surveying and mapping.

Step 2: Establish a three-dimensional parameterized model of the hoisting container according to the structural parameter of the hoisting container, and perform finite element static analysis on the established virtual prototype model.

Step 3: Establish, by using a design of experiment method, random sampling matrixes of basic parameters according to the means and the variances of the basic parameters of the hoisting container determined in step 1 in conjunction with a Latin hypercube sampling method.

Step 4: Obtain a stress strength factor and a strain random response sample of the hoisting container by means of model reconstruction and finite element reanalysis in conjunction with an experiment design matrix.

Step 5: Fit the experiment design matrix and the random response sample by using a Kriging method, so as to establish a mapping relationship between a random response and a random parameter of the hoisting container.

Step 6: Respectively establish reliability performance functions in a fracture failure and in a stiffness failure in accordance with a damage tolerance criterion of crack extension and a stiffness design criterion of the hoisting container; and calculate the first three order moments of the random parameter according to a mean and a variance of the random parameter, so as to solve a mean, a variance, and three order moment of each performance function according to the established function, and respectively calculate failure probabilities in two failure modes by using a saddlepoint approximation method based on the first three order moments.

Step 7: Obtain a correlation coefficient between the two failure modes by using a statistics method, establish a joint probability model thereof by using a Clayton copula, and solve a system failure probability with failure correlation in conjunction with a system reliability method.

Step 8: Establish a parameter sensitivity model concerning a mean, a standard deviation, and a skewness of a random variable for system reliability by using a matrix differential technology.

Step 9: Introduce the system reliability and the parameter sensitivity model into an optimization design model, to establish the reliability robust design model of the hoisting container.

Embodiments

Figure 2:
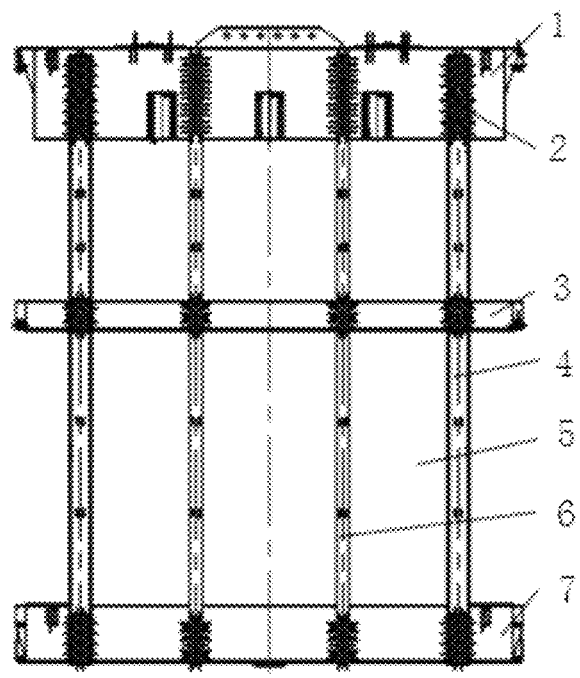
FIG. 2 is a schematic structural diagram of a hoisting container.
Figure 3:
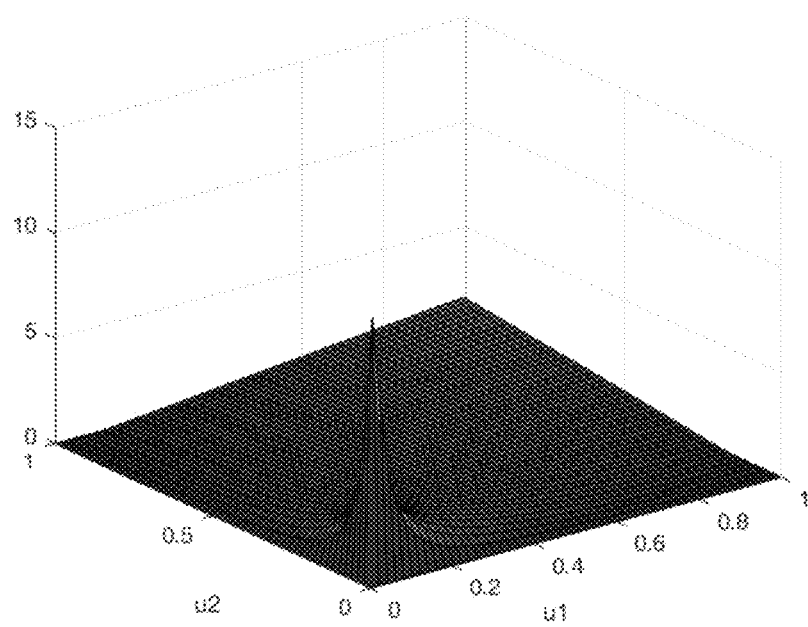
FIG. 3 is a probability density diagram of a Clayton copula function.
Figure 4:
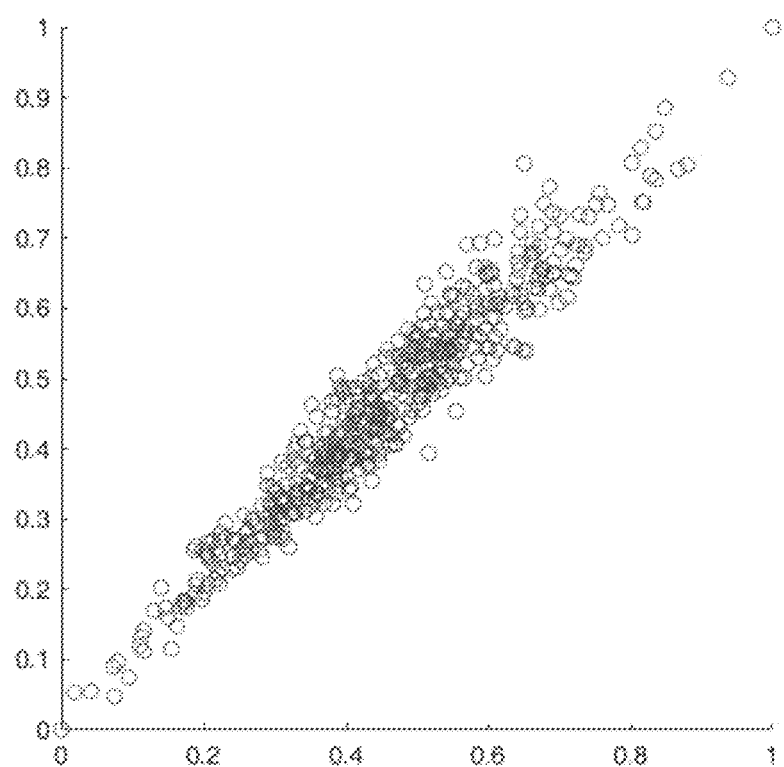
FIG. 4 is a scatter diagram of a Clayton copula function.

To understand the features and engineering applicability of the present invention more sufficiently, in the present invention, for an ultra-deep well hoisting container structure to be constructed shown in FIG. 2, system reliability analysis and structural design with failure correlation are performed.

The hoisting container bears a vertical load and a bending-torsional coupling effect. An experiment design sample matrix of a random variable of the hoisting container is established according to a structural dimension and a dynamic load of the hoisting container, and a stress strength factor and a strain random response of the hoisting container are calculated by finite element analysis, to obtain a response sample matrix. A fitting function between a random response and an experiment design sample matrix is established by using a Kriging method, so as to establish explicit functions in two failure modes, namely, a fracture strength failure and a stiffness failure, in accordance with a damage tolerance criterion and a stiffness criterion. Table 1 provides probability information of random variables of the hoisting container in the present embodiment. $L_1$ is a length of the hoisting container, $L_2$ is a height of the hoisting container, $L_3$ is a width of the hoisting container, $L_4$ is a length of a lower tray, and $L_5$ is a width of the lower tray.

TABLE 1

Probability statistical characteristics of random variables of the hoisting container

| Variable | Mean | Standard deviation | Distribution type |
|---|---|---|---|
| $L_1$ (mm) | 4000 | 200 | Normal |
| $L_2$ (mm) | 3170 | 158.5 | Normal |
| $L_3$ (mm) | 2050 | 102.5 | Normal |
| $L_4$ (mm) | 4000 | 200 | Normal |
| $L_5$ (mm) | 1800 | 90 | Normal |

In this embodiment, a failure probability in a fracture strength failure mode, namely, $Pf_1=0.004698$, and a stiffness failure probability, namely, $Pf_2=0.007344$, are obtained by using a solution method for a failure probability provided in the present invention. The n random samples of random variables of the hoisting container are generated according to distribution types of the random variables, and are respectively substituted into functions in the two failure modes, to calculate n response values. A correlation coefficient between random response samples in the two failure modes is obtained by MATLAB calculation, and a parameter to be determined of the Clayton copula function is estimated by using the correlation coefficient, so as to establish a joint probability model with failure correlation of the hoisting container. The obtained failure probabilities $Pf_1$ and $Pf_2$ are substituted into a system reliability analysis model.

$$P_{f1} + \sum_{i=2}^{m} \max\left(P_{fi} - \sum_{j=1}^{i-1} P_{fij}, 0\right) \leq P_{fs} \leq \sum_{i=1}^{m} P_{fi} - \sum_{i=2}^{m} \max(P_{fij})$$

In the formula, m=2 indicates a number of failure modes of the hoisting container, $P_{f1}$ indicates a maximum failure probability in the failure modes of the hoisting container, $P_{fi}$ indicates a failure probability of the $i^{th}$ failure mode, $Py_{fij}$ indicates a joint failure probability of the $i^{th}$ and the $j^{th}$ failure modes, and $P_{fs}$ indicates a system failure probability with failure correlation of the hoisting container.

The system failure probability, namely, $P_{fs}=0.01319$, of the hoisting container with correlation between the fracture strength failure and the stiffness failure of the hoisting container is calculated based on a Clayton copula-based joint probability model. The system failure probability, namely, $P_{fsm}=0.01142$, of the hoisting container is calculated by using a simulation method for 1000 times.

Parameter sensitivity concerning a mean, a standard deviation, and a skewness of a random variable of the system failure probability is calculated below:

$\partial p_f/\partial \mu_{L1}=2.729\times10^{-1}$, $\partial p_f/\partial \sigma_{L1}=8.414\times10^{-2}$, $\partial p_f/\partial \lambda_{L1}=-1.165\times10^{-3}$ $\partial p_f/\partial \mu_{L2}=5.251\times10^{-2}$, $\partial p_f/\partial \sigma_{L2}=2.668\times10^{-3}$, $\partial p_f/\partial \lambda_{L2}=-5.125\times10^{-3}$ $\partial p_f/\partial \mu_{L3}=5.156\times10^{-2}$, $\partial p_f/\partial \sigma_{L3}=3.410\times10^{-2}$, $\partial p_f/\partial \lambda_{L3}=-3.847\times10^{-2}$ $\partial p_f/\partial \mu_{L4}=7.859\times10^{-1}$, $\partial p_f/\partial \sigma_{L4}=5.875\times10^{-1}$, $\partial p_f/\partial \lambda_{L4}=-2.651\times10^{-2}$ $\partial p_f/\partial \mu_{L5}=3.614\times10^{-1}$, $\partial p_f/\partial \sigma_{L5}=3.018\times10^{-1}$, $\partial p_f/\partial \lambda_{L5}=-6.331\times10^{-3}$ With a total volume of the hoisting container as an optimization object, and system reliability and parameter sensitivity of a structural system as constraint conditions, an optimized structural parameter combination can be obtained by using a non-linear optimization method as follows:
$L_1=3817.413$ mm, $L_2=3119.55$ mm, $L_3=2112.93$ mm, $L_4=3817.41$ mm. $L_5=1850.01$ mm A total volume of the hoisting container before optimization is 15.99 m³, and after reliability robust optimization is used, under the condition of satisfying reliability constraints in an optimization model, a total volume of a hoisting container structure is 15.16 m³.

A total volume of an optimized structure obtained by using a conventional optimization design method is 15.37 m³.

It can be seen by comparing the foregoing results that the reliability robust design method provided in the present invention can produce a better optimization result.

In conclusion, the present invention provides a system reliability robust design method for an ultra-deep well hoisting container in consideration of failure correlation. Firstly, a three-dimensional parameterized model of a hoisting container is established according to a structural dimension of the hoisting container; secondly, experiment design sample matrixes of random variables are established according to probability properties of random variables of the hoisting container, and fracture strength and stiffness response of the hoisting container in the sample matrixes are solved by using a finite element method; thirdly, an explicit function between a random response and a random variable matrix is established by using a Kriging method, and explicit functions in two failure modes are respectively established in accordance with a damage tolerance criterion and a stiffness design criterion; then, failure probabilities in the two failure modes are calculated by using a saddlepoint approximation method based on the first three order moments, a joint failure probability model between the two failure modes is constructed by using a Clayton copula function, and system reliability in a joint failure is solved by using a system reliability method; and finally, parameter sensitivity concerning the random variables for the system reliability is calculated, and an optimal parameter combination is obtained by using a reliability robust design model.

Those that are not described in detail in the present invention are known to a person skilled in the art.

What is claimed is:

1. A reliability robust design method for multiple failure modes of an ultra-deep well hoisting container, comprising the following steps:

step 1: determining means and variances of basic parameters including a dimension parameter, a material property parameter, and a load of the ultra-deep well hoisting container, determining a distribution type of each parameter, and establishing a finite element model of the ultra-deep well hoisting container;

step 2: obtaining a random response sample of a structural failure for each set of driving parameters according to the means and the variances of the basic parameters of the ultra-deep well hoisting container determined in step 1 in conjunction with a Latin hypercube sampling design of experiment method;

step 3: using input and output samples in step 2 by using a Kriging method, to obtain a mapping relationship between a failure response and a structural performance parameter of the ultra-deep well hoisting container, and establishing reliability functions in the failure modes in accordance with a design criteria of failures of the hoisting container;

step 4: respectively solving, according to probability information of the basic parameters, failure probabilities of the failure modes by using a moment-based saddlepoint approximation method;

step 5: establishing a joint failure distribution with probability correlation of the failure modes by using a Clayton copula function, establishing a system reliability model in a joint probability failure, and solving a system failure probability of the ultra-deep well hoisting container;

step 6: establishing a sensitivity model concerning a random parameter for system reliability of the ultra-deep well hoisting container by using a partial derivative; and step 7: establishing the reliability robust design model of the ultra-deep well hoisting container by using the sensitivity model concerning the random parameter for the system reliability and the system failure probability of the ultra-deep well hoisting container obtained in step 5 and step 6 used as constraints, wherein the step 5 further comprising:

performing a random sampling by using a uniform sampling method in accordance with a distribution type of a random variable of the ultra-deep well hoisting container, to obtain a discrete sample value of each random variable;

using the discrete sample value in a reliability function of the reliability functions established in step 3, to obtain a corresponding function sample value;

calculating a rank correlation coefficient between two failure modes, using the rank correlation coefficient in a Clayton copula function model, to calculate a parameter to be determined of the Clayton copula, and establishing a joint probability model for describing probability correlation;

calculating a joint failure probability with correlation of multiple failure modes of the ultra-deep well hoisting container by using the joint probability model; and calculating the system failure probability of the ultra-deep well hoisting container.

2. The reliability robust design method for multiple failure modes of an ultra-deep well hoisting container according to claim 1, wherein the step 1 further comprising:

determining distribution types, means, and variances of a structural dimension and a material property of the ultra-deep well hoisting container;

determining the load of the ultra-deep well hoisting container, to determine distribution types, means, and variances of loads, including a static load, a bending moment, and a torque, borne by the ultra-deep well hoisting container in each case; and establishing a finite element analysis model of the ultra-deep well hoisting container based on the foregoing information.

3. The reliability robust design method for multiple failure modes of an ultra-deep well hoisting container according to claim 1, wherein the step 2 further comprising:

forming a process file of modeling by parameterized modeling of the ultra-deep well hoisting container;

forming a process file of finite element analysis by finite element analysis of the ultra-deep well hoisting element, wherein a structural parameter of the ultra-deep well hoisting container comprises a dimension of the ultra-deep well hoisting container and a dimension of a chassis; and a material performance parameter comprises an elastic modulus, a Poisson's ratio, and density; and driving, by using a Latin hypercube sampling design of experiment method, the parameters of the ultra-deep well hoisting container to perform random finite element analysis, to obtain a random response sample with a random input.

4. The reliability robust design method for multiple failure modes of an ultra-deep well hoisting container according to claim 1, wherein the step 3 further comprising:

using the input and output samples obtained in step 2 by using the Kriging method to establish an explicit function relationship between a random response and a random parameter; and establishing the reliability functions in the failure modes in accordance with the design criteria of the failure modes, wherein the ultra-deep well hoisting container is a large-scale welded structural component, and when strength reliability of the ultra-deep well hoisting container is investigated, fracture mechanics analysis is used, and fracture resistance performance of the ultra-deep well hoisting container is used as a criterion for strength design.

5. The reliability robust design method for multiple failure modes of an ultra-deep well hoisting container according to claim 1, wherein the step 4 further comprising:

calculating first three order moments, including a mean, a variance, and skewness, of each function by using a random perturbation technology, and solving the failure probabilities of the failure modes by using a saddle-point approximation method based on the first three order moments.

6. The reliability robust design method for multiple failure modes of an ultra-deep well hoisting container according to claim 1, wherein the step 6 further comprising:

on the basis of establishing a system failure probability of the ultra-deep well hoisting container, performing derivation on a mean, a standard deviation, and a skewness of a random variable by using a matrix calculus according to the partial derivative, to establish a parameter sensitivity model concerning the mean, the standard deviation, and the skewness of the random variable for the system reliability of the ultra-deep well hoisting container.

7. The reliability robust design method for multiple failure modes of an ultra-deep well hoisting container according to claim 1, wherein the step 7 further comprising:

introducing a system reliability and a parameter reliability sensitivity model obtained and are based on a copula function into an optimization design model as constraints, to establish the reliability robust design model of the ultra-deep well hoisting container.

* * * * *